(12) United States Patent
Sutton

(10) Patent No.: US 7,402,247 B2
(45) Date of Patent: Jul. 22, 2008

(54) SYSTEM FOR WASTEWATER TREATMENT AND DIGESTION HAVING AEROBIC AND ANAEROBIC TREATMENT ZONES

(75) Inventor: Paul Matthew Sutton, Enfield, NH (US)

(73) Assignee: Shaw Intellectual Property Holdings, Inc., Baton Rouge, LA (US)

( * ) Notice: Subject to any disclaimer, the term of this patent is extended or adjusted under 35 U.S.C. 154(b) by 209 days.

(21) Appl. No.: 11/300,640

(22) Filed: Dec. 14, 2005

(65) Prior Publication Data

US 2006/0196829 A1 Sep. 7, 2006

Related U.S. Application Data

(60) Provisional application No. 60/635,740, filed on Dec. 14, 2004, now abandoned.

(51) Int. Cl.
*C02F 3/30* (2006.01)
(52) U.S. Cl. .................. 210/603; 210/605; 210/607; 210/612; 210/622; 210/623
(58) Field of Classification Search ................ 210/603, 210/605, 607, 612, 613, 621, 622, 623, 630
See application file for complete search history.

(56) References Cited

U.S. PATENT DOCUMENTS 2,196,840 A * 4/1940 Singleton ................ 210/626
2,359,004 A 9/1944 Schlenz et al.

(Continued)

FOREIGN PATENT DOCUMENTS

DE 4036548 * 5/1992

(Continued)

OTHER PUBLICATIONS

Thomas E. Schultz, Biological Wastewater Treatment, Chemical Engineering, Oct. 2005, pp. 44-50.

*Primary Examiner*—Fred Prince
(74) *Attorney, Agent, or Firm*—Luedeka, Neely & Graham, P.C.

(57) ABSTRACT

The specification discloses a method for treating and digesting organic wastes in a wastewater stream. A first wastewater influent stream is mixed with an activated sludge biomass in an aerobic digestion zone, so that least a portion of the organic wastes in the first wastewater influent stream are digested by activated sludge biomass. The first wastewater influent stream is separated from the activated sludge biomass in a first separation zone to recover activated sludge biomass and to provide a wastewater effluent stream. The second wastewater influent stream is mixed with recovered activated sludge biomass from the aerobic digestion zone in a substantially anaerobic adsorption zone so that at least a portion of the organic wastes in the second wastewater influent stream are adsorbed by the activated sludge biomass. The second wastewater influent stream and the activated sludge biomass are then separated in a second separation zone to recover the activated sludge biomass and organic wastes adsorbed thereto from the anaerobic adsorption zone and to provide a substantially liquid wastewater stream which is recycled to the aerobic digestion zone. Finally, at least a portion of the activated sludge biomass and adsorbed organic wastes from the anaerobic adsorption zone are digested under substantially anaerobic conditions so as to recover a combustible gas stream. An apparatus for carrying out the method is also disclosed.

12 Claims, 2 Drawing Sheets

U.S. PATENT DOCUMENTS

| | | | | |
|---|---|---|---|---|
| 2,786,025 A | * | 3/1957 | Lamb et al. | 210/603 |
| 3,440,166 A | * | 4/1969 | Davis et al. | 210/603 |
| 3,980,556 A | * | 9/1976 | Besik | 210/616 |
| 4,246,099 A | * | 1/1981 | Gould et al. | 210/603 |
| 4,568,462 A | * | 2/1986 | Bohnke et al. | 210/605 |
| 4,626,354 A | * | 12/1986 | Hoffman et al. | 210/603 |
| 4,681,685 A | * | 7/1987 | Sutton et al. | 210/618 |
| 5,228,996 A | | 7/1993 | Lansdell | |
| 5,393,427 A | * | 2/1995 | Barnard | 210/605 |
| 5,514,277 A | * | 5/1996 | Khudenko | 210/603 |
| 5,514,278 A | * | 5/1996 | Khudenko | 210/605 |
| 6,163,932 A | | 12/2000 | Rosen | |
| 6,444,124 B1 | | 9/2002 | Onyeche et al. | |
| 6,444,125 B2 | | 9/2002 | Han | |
| 6,673,243 B2 | | 1/2004 | Srinivasan | |
| 6,723,242 B1 | | 4/2004 | Ohkata et al. | |
| 2002/0192809 A1 | * | 12/2002 | Lanting et al. | 435/290.1 |
| 2004/0094475 A1 | | 5/2004 | Hough | |

FOREIGN PATENT DOCUMENTS

| | | | |
|---|---|---|---|
| JP | 57-136996 A | | 8/1982 |
| JP | 1-135596 | * | 5/1989 |
| WO | WO 2004/046049 | | 6/2004 |

* cited by examiner

SYSTEM FOR WASTEWATER TREATMENT AND DIGESTION HAVING AEROBIC AND ANAEROBIC TREATMENT ZONES

This application claims the benefit of the filing date of provisional application Ser. No. 60/635,740, filed Dec. 14, 2004, now abandoned.

FIELD OF THE INVENTION

The invention relates to methods and systems for wastewater treatment and, in particular, to a method and system for wastewater treatment using activated sludges.

BACKGROUND OF THE INVENTION

Organic contaminants in wastewaters are often treated by digesting the organic materials using activated sludges composed of a biomass of microorganisms such as bacteria. Typically the activated sludge is mechanically aerated to provide a highly aerobic environment in which the microorganisms may consume the organic contaminants via aerobic digestion. While effective, aerated sludges require a significant energy input to keep the sludge throughly mixed and aerated.

Anaerobic digestion of organic wastes is also known. However, anaerobic digestion has generally been found to be significantly slower than aerobic digestion and thus requires significantly larger digestion tanks than aerobic digestion processes.

What is needed therefore, is a process for the digestion of organic wastes using activated sludge which has a reduced energy input requirement but which also allows for the rapid digestion of the wastes by the sludge microorganisms.

SUMMARY OF THE INVENTION

With regard to the foregoing and other objects and advantages, the present invention, in one aspect, provides a method for treating and digesting organic wastes in a wastewater stream. According to the method, a wastewater stream containing organic wastes is divided into a first wastewater influent stream and a second wastewater influent stream. The first wastewater influent stream is mixed with an activated sludge biomass in a substantially aerobic digestion zone, so that organic wastes in the first wastewater influent stream are digested by activated sludge biomass. At least a portion of the first wastewater influent stream is separated from the activated sludge biomass in a first separation zone to recover the activated sludge biomass therefrom and to provide a wastewater effluent stream. Also according to the method, the second wastewater influent stream is mixed with recovered activated sludge biomass from the aerobic digestion zone in a substantially anaerobic adsorption zone so that organic wastes in the second wastewater influent stream are adsorbed by activated sludge biomass. At least a portion of the second wastewater influent stream and the activated sludge biomass are then separated in a second separation zone to recover activated sludge biomass and organic wastes adsorbed thereto from the anaerobic adsorption zone. At least a portion of a substantially liquid wastewater stream from the second separation zone is recycled to the aerobic digestion zone. Finally, at least a portion of the activated sludge biomass and adsorbed organic wastes from the anaerobic adsorption zone are digested under substantially anaerobic conditions so as to recover a combustible gas stream. Preferably this combustible gas stream includes at least methane.

In certain embodiments of the invention, it is preferred that at least a portion of activated sludge biomass recovered in the first separation zone is recycled to the aerobic digestion zone. In certain other embodiments, it is also preferred that at least a portion of activated sludge biomass recovered in the second separation zone is recycled to the anaerobic adsorption zone.

In certain other embodiments, the method further includes a step of mixing the first wastewater influent stream with at least a portion of activated sludge biomass under at least partially anaerobic conditions prior to mixing the first wastewater influent stream with activated sludge biomass in the aerobic digestion zone.

Generally, the step of digesting at least a portion of the activated sludge biomass and organic wastes under substantially anaerobic conditions preferably includes digesting the activated sludge biomass and organic wastes in a plurality of successive substantially anaerobic digestion zones wherein the organic wastes are progressively digested by a plurality of microbial species.

With respect to the operating ranges of the method, the aerobic digestion zone is preferably maintained at a temperature of from about 5° C. to about 35° C., the anaerobic adsorption zone is preferably maintained at a temperature of from about 5° C. to about 35° C., and the substantially anaerobic digestion is preferably carried out at a temperature of from about 25° C. to about 40° C. It is also generally preferred that the second wastewater influent stream has a volumetric flow rate which is from about 20% to about 60% of the flow rate of the first wastewater influent stream.

According to certain embodiments of the invention, the organic wastes in the wastewater stream are preferably digested using at least 30% less energy than by aerobic digestion alone.

In another aspect, the present invention provides a system for treating and digesting organic wastes in wastewater. The system includes an aerobic digester in fluid flow communication with a first wastewater influent stream containing organic wastes. Within the aerobic digester, the first wastewater influent stream is mixed with an activated sludge biomass so that at least a portion of the organic wastes in the first wastewater influent stream are digested by activated sludge biomass. The system also includes a first separator in fluid flow communication with the aerobic digester which separates at least a portion of the first wastewater influent stream from the activated sludge biomass so as to recover activated sludge biomass therefrom and to provide a wastewater effluent stream.

Also included is an anaerobic adsorption vessel in fluid flow communication with a second wastewater influent stream containing organic wastes and with recovered activated sludge biomass from the first separator. Within the anaerobic adsorption vessel recovered activated sludge biomass is mixed with the second wastewater influent stream under substantially anaerobic conditions and organic wastes in the second wastewater influent stream are adsorbed by the activated sludge biomass. A second separator in fluid flow communication with the anaerobic adsorption vessel separates at least a portion of the second wastewater influent stream and activated sludge biomass so as to recover the activated sludge biomass and organic wastes adsorbed thereto and to recycle a substantially liquid wastewater stream which is transferred to the aerobic digestion zone.

Finally, the system includes an anaerobic digester in fluid flow communication with at least a portion of activated sludge biomass and adsorbed organic wastes from the anaerobic adsorption zone. In certain embodiments of the invention, a combustible gas stream is preferably recovered from the anaerobic digester. This combustible gas stream preferably includes at least methane.

According to certain embodiments of the invention, it is preferred that at least a portion of activated sludge biomass recovered in the first separator is recycled to the aerobic digester. In certain other embodiments, it is also preferred that at least a portion of activated sludge biomass recovered in the second separator is recycled to the anaerobic adsorption vessel.

Generally, it is preferred that the anaerobic digester includes a plurality of successive substantially anaerobic digestion zones wherein the organic wastes are progressively digested by a plurality of microbial species under substantially anaerobic conditions.

In operation, the aerobic digester is preferably maintained at a temperature of from about 5° C. to about 35° C., the anaerobic adsorption vessel is preferably maintained at a temperature of from about 5° C. to about 35° C., and the anaerobic digester is preferably carried out at a temperature of from about 25° C. to about 4020 C. It is also generally preferred that the second wastewater influent stream has a volumetric flow rate which is from about 20% to about 60% of the flow rate of the first wastewater influent stream.

BRIEF DESCRIPTION OF THE DRAWINGS

The above and other aspects and advantages of the invention will now be further described in conjunction with the accompanying drawings in which.

DETAILED DESCRIPTION OF THE INVENTION

Figure 1:
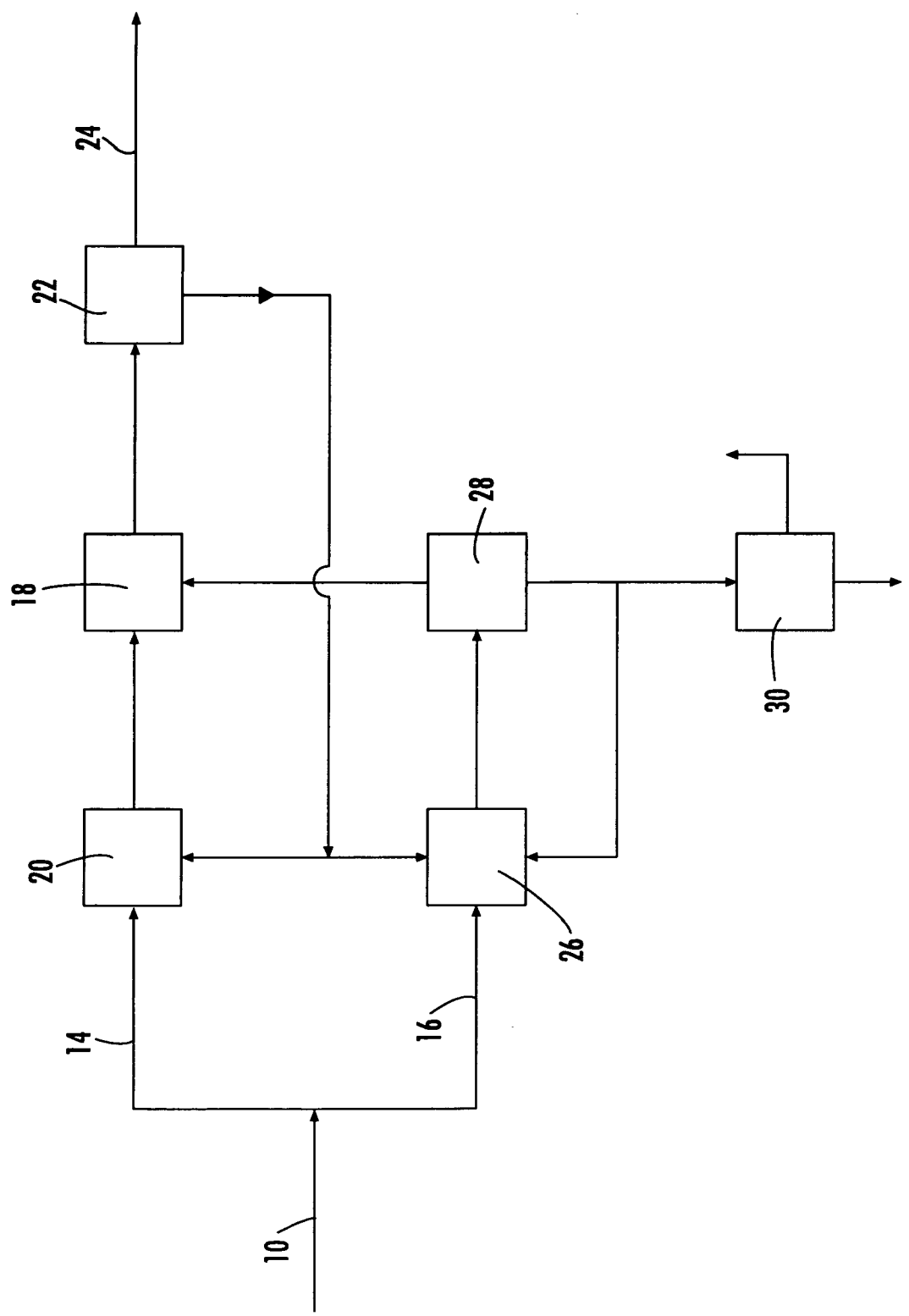
FIG. 1 is a process flow diagram illustrating one embodiment of the present invention.

Referring now to the drawings, various aspects of one embodiment of a wastewater treatment method according to the invention will now be described with reference to FIG. 1 wherein there is depicted a process for the treatment of a wastewater influent 10 which is contaminated with organic wastes. The wastewater stream 10 is initially split into two influent streams, a first wastewater influent stream 14 and a second wastewater influent stream 16. The first and second wastewater influent streams 14, 16 are simultaneously treated using an aerobic process and an anaerobic process as described in greater detail hereinafter. Both wastewater influent streams include organic waste contaminants.

The overall flow rate of the wastewater influent streams 14, 16 may range from about 0.02 mgd to about 100 mgd. Of this, from about 40% to about 80% of the overall influent is directed to the first wastewater influent stream 14 and from about 20% to about 60% of the overall influent is directed to the second wastewater influent stream 16.

The first wastewater influent stream 14 is pumped or otherwise transported to a substantially aerobic digestion zone. The aerobic digestion zone may be provided by an aerobic digester vessel which may have an average residence time (and hence an average contact time with the activated sludge) of from about 0.5 hours to 24 hours. The aerobic digester 18 may also include an air sparge or other device for aerating the materials within the aerobic digester 18 so as to maintain an oxygen-rich, aerobic environment. In certain embodiments, the digester 18 may further include one or more impellers or other mechanical mixing devices to insure adequate mixing of the materials within the digester 18. However, in other embodiments it may also be possible to maintain adequate mixing within the digester 18 by aeration alone.

In a preferred embodiment of the invention, the aerobic digester 18 is a fixed film aerobic reactor having plastic media or other fixed structure within the reactor. A film of bacteria from the activated sludge biomass grows upon the media or structure thereby leading to more efficient aerobic digestion within the reactor.

The aerobic digester 18 is preferably operated within a temperature range of from about 5° C. to about 35° C. and within a pH of from about 6.0 to about 9.0.

Within the aerobic digestion zone provided by the aerobic digester 18 the first wastewater influent stream 14 is mixed with a biomass of activated sludge. The activated sludge includes microorganisms, such as bacteria and protozoa, which are capable of digesting the organic wastes present in the wastewater. The aerobic digester 18 is sized in proportion to the volumetric flowrate of the first wastewater influent stream 14 so that the wastewater has an average residence time in the aerobic digester (and hence average contact time with the activated sludge) of from about 0.5 hours to about 24 hours. A significant portion of the organic wastes in the first wastewater influent stream 14 are thus digested by the activated sludge.

In certain embodiments of the invention, it may also be preferred to mix the first wastewater influent stream with the activated sludge in an initial anaerobic zone 20 prior to contacting and treatment in the aerobic digester 18, particularly if phosphate consuming microorganisms are of concern. If desired the initial aerobic zone 20 and the aerobic digester 18 may be provided by two zones within a single, two-stage reaction vessel.

The now-digested first wastewater influent stream 14 and activated sludge then pass out of the aerobic digester 18 to a first separation zone provided by a first separator 22 which is in fluid flow communication with the aerobic digester 18. The first separator 22 may include a filtration device and/or a clarifier or settling tank or other solid-liquid separation device and separates at least a portion of the wastewater liquid from the activated sludge. The wastewater liquid from the first separator 22 exits the treatment system as a wastewater effluent stream 24.

After separation from the effluent 24, at least a portion of the activated sludge biomass is recovered. Most of the recovered sludge is recycled back to the aerobic digester 18 wherein it is again used to digest organic wastes in the incoming first wastewater influent stream 14. If an initial anaerobic treatment zone 20 is being utilized prior the aerobic digester 18, the sludge may be recycled to the initial anaerobic treatment zone 20 and then to the aerobic digester 18.

The remainder of the recovered activated sludge is pumped, augured, or otherwise transported to an anaerobic adsorption zone. The anaerobic adsorption zone may be provided by an anaerobic adsorption vessel 26 which is in fluid flow communication with the first separator 22. The anaerobic adsorption vessel 26 may have an average residence time (and hence an average contact time with the activated sludge) of from about 0.5 hours to 4.0 hours. The anaerobic adsorption vessel 26 is preferably operated within a temperature range of from about 5° C. to about 35° C. and within a pH of from about 6.0 to about 9.0.

Within the anaerobic adsorption zone provided by the anaerobic adsorption vessel 26 the recovered activated sludge is mixed with the second wastewater influent stream 16 under substantially anaerobic conditions. In this regard, the anaerobic adsorption vessel 26 is sized in proportion to the volumetric flowrate of the second wastewater influent stream 16 so that the wastewater has an average residence time in the vessel 26 (and hence average contact time with the activated sludge) of from about 0.5 hours to about 4.0 hours. During this time, a significant portion of the organic wastes in the second wastewater influent stream 16 are thus adsorbed by the activated sludge and removed from the wastewater. Without being bound by theory, it is believed that a portion of the organic wastes may be anaerobically digested by the sludge while in the anaerobic adsorption vessel 26; however, it is believed that the greater portion of the adsorbed organic wastes are merely retained within the biomass of the activated sludge and are digested later as described hereinafter.

The second wastewater influent stream 16 and the activated sludge then pass out of the anaerobic adsorption vessel 26 to a second separation zone provided by a second separator 28 which is in fluid flow communication with the anaerobic adsorption vessel 26. The second separator 28 may include a filtration device and/or a clarifier or settling tank or other solid-liquid separation device and separates at least a portion of the wastewater liquid from the activated sludge and the organic wastes adsorbed by the activated sludge. The wastewater liquid from the second separator 28 is then preferably pumped or otherwise transferred to the aerobic digester 18 were it is further treated along with the first wastewater influent stream 14 and any remaining organic wastes in the wastewater are aerobically digested therein.

The activated sludge biomass is then recovered from the second separator 28. A portion of the recovered sludge is recycled back to the anaerobic adsorption vessel 26 wherein it is further used to adsorb organic wastes in the incoming second wastewater influent stream 16.

The remainder of the recovered activated sludge and adsorbed organic wastes from the second separator 28 is pumped, augured, or otherwise transported to an anaerobic digester 30 is sized in proportion to the flow of activated sludge to the anaerobic digester 30 so the activated sludge has an average residence time in the anaerobic digester 30 of from about 0.5 days to 15 days. The anaerobic digester 30 is preferably operated within a temperature range of from about 25° C. to about 40° C. and within a pH of from about 6.0 to about 9.0.

Within the anaerobic digester 30, bacteria or other microorganisms digest adsorbed organic wastes breaking them down into simpler, nonhazardous chemicals. In general it is believed that the digestion of complex organic wastes is accomplished by a plurality of bacterial microorganism species which progressively convert the complex organic wastes into simpler chemical compounds. In particular, it is believed that more complex molecules such as lipids, cellulosic materials and starches are initially broken down by hydrolysis reactions into fatty acids and sugars. These reactions are believed to be predominantly carried out by a group of hydrolytic and fermentative bacteria. The fatty acids, sugars, and the like are in turn converted to acetates by a second group of acetogenic bacteria. Hydrogen gas may also be produced during these reactions. Finally, the acetates are converted into methane gas and carbon dioxide by a third group of methanogenic bacteria.

Figure 2:
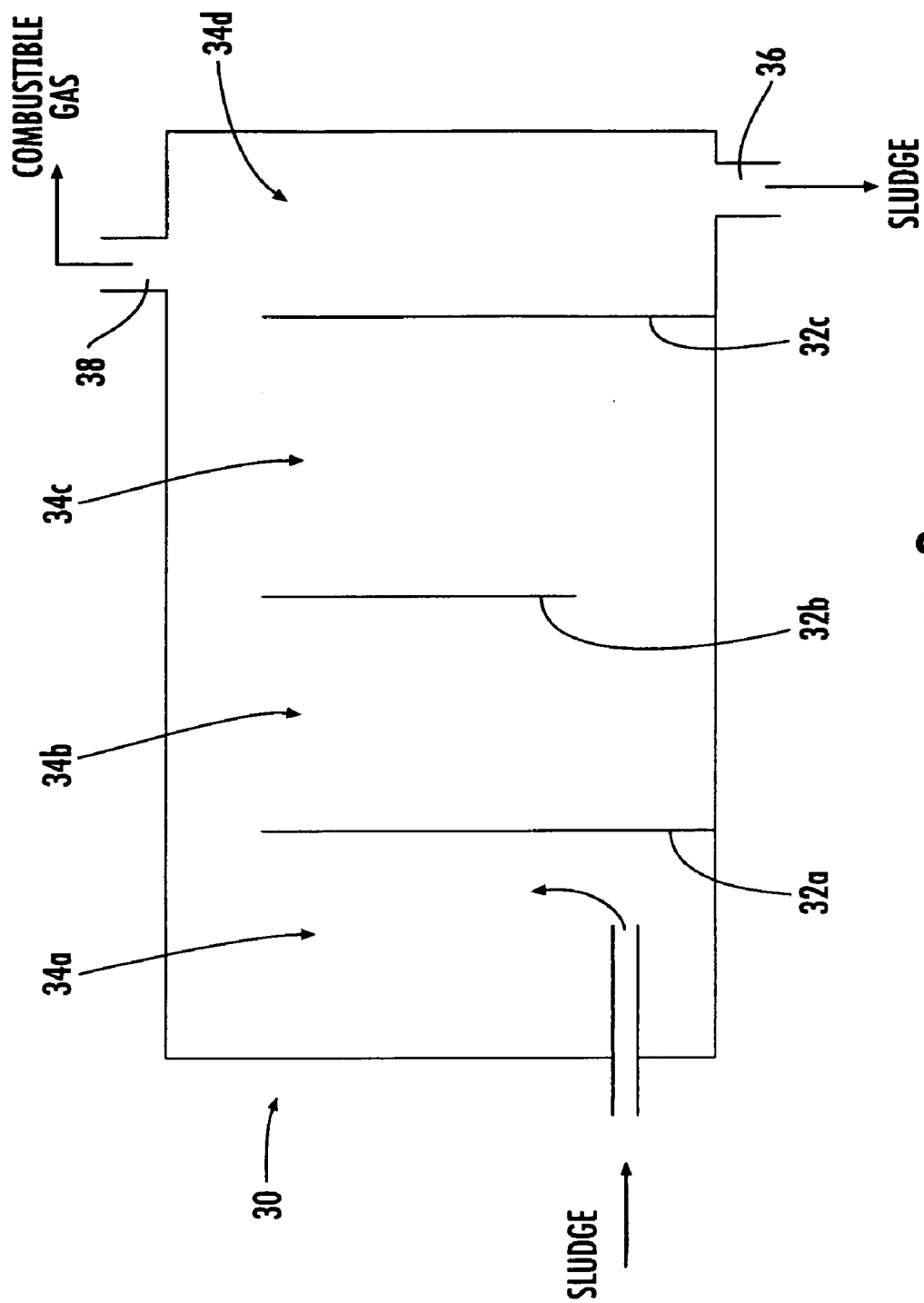
FIG. 2 is a schematic drawing illustrating an anaerobic digester for use in one embodiment of the present invention.

Preferably, the anaerobic digester 30 includes a serial of baffles 32*a, b, c* which divide the anaerobic digester into a plurality of anaerobic digestion zones 34*a, b, c, d* as shown in FIG. 2. These anaerobic digestion zones 34 *a, b, c, d* are in fluid flow communication with one another so that the sludge may enter a first anaerobic digestion zone 34 *a* then flow through a series of additional anaerobic digestion zones 34 *b, c, d* before exiting the digester 30 through a sludge outlet port 36.

In this arrangement, it is believed that the first anaerobic digestion zone may be substantially enriched in the hydrolytic and fermentative bacteria which carry out the aforementioned initial hydrolysis reactions. Later digestion zones may be enriched in acetogenic bacteria and methanogenic bacteria which carry out acetate-generating and methane-generating reactions respectively so that the organic wastes adsorbed by the sludge are progressively digested. As a substantial amount of methane is produced by the digestion process, a combustible gas stream may be recovered from the anaerobic digester 30 via gas outlet port 38.

Because the different reactions in the digestion process produce at differing rates, the digestion zones of the aerobic digester 30 are preferably sized so as to provide a sludge residence time within the digestion zone which is proportional to the rate of reaction of the process preferably being carried out in the respective digestion zones. For instance, since it is believed that the initial hydrolysis reactions generally occur at a slower reaction rate than the later acetate-generating and methane-generating reactions, the initial digestion zone is sized so to have a larger residence time than the acetate-generating and methane-generating digestion zones.

The present invention thus allows for a substantial portion of the organic wastes in the initial wastewater stream to be digested anaerobically. Since these anaerobic processes require no energy input in the form of mechanical aeration, there is a substantial reduction in energy requirements for the process of the invention as compared to conventional activated sludge treatments utilizing aerobic digestion. The total energy savings may be up to 30% as compared to the use of aerobic digestion alone. Moreover, the overall process is relatively quick as compared to prior art usages of anaerobic digestion processes alone.

Having now described various aspects of the invention and preferred embodiments thereof, it will be recognized by those of ordinary skill that numerous modifications, variations and substitutions may exist within the spirit and scope of the appended claims.

What is claimed is:

1. A method for treating and digesting organic wastes in a wastewater stream, comprising the steps of:

dividing a wastewater stream containing organic wastes into a first wastewater influent stream and a second wastewater influent stream;

mixing at least a portion of the first wastewater influent stream with an activated sludge biomass in a substantially aerobic digestion zone, wherein organic wastes in the first wastewater influent stream are digested by the activated sludge biomass;

separating at least a portion of the first wastewater influent stream from activated sludge biomass in a first separation zone to recover activated sludge biomass therefrom and to provide a wastewater effluent stream;

mixing at least a portion of the second wastewater influent stream with activated sludge biomass recovered from the aerobic digestion zone in a substantially anaerobic adsorption zone, wherein organic wastes in the second wastewater influent stream are adsorbed by the activated sludge biomass;

separating at least a portion of the second wastewater influent stream from the activated sludge biomass therein in a second separation zone to recover activated sludge biomass therefrom and organic wastes adsorbed thereto from the anaerobic adsorption zone;

recycling a substantially liquid wastewater stream from the second separation zone to the aerobic digestion zone; and digesting at least a portion of the activated sludge biomass and adsorbed organic wastes from the anaerobic adsorption zone under substantially anaerobic conditions in a plurality of successive substantially anaerobic digestion zones, wherein the organic wastes are progressively digested by a plurality of microbial species, so as to recover a combustible gas stream.

2. The method of claim 1, further comprising the step of recycling at least a portion of activated sludge biomass recovered in the first separation zone to the aerobic digestion zone.

3. The method of claim 1, further comprising the step of recycling at least a portion of activated sludge biomass recovered in the second separation zone to the anaerobic adsorption zone.

4. The method of claim 1, further comprising the step of mixing the first wastewater influent stream with at least a portion of activated sludge biomass under at least partially anaerobic conditions prior to mixing the first wastewater influent stream with activated sludge biomass in the aerobic digestion zone.

5. The method of claim 1, wherein the combustible gas stream recovered comprises methane.

6. The method of claim 1, wherein the aerobic digestion zone is maintained at a temperature of from about 5° C. to about 35° C.

7. The method of claim 1, wherein the anaerobic adsorption zone is maintained at a temperature of from about 5° C. to about 35° C.

8. The method of claim 1, wherein the substantially anaerobic digestion is carried out at a temperature of from about 25° C. to about 40° C.

9. The method of claim 1, wherein the organic wastes in the wastewater stream are digested using at least 30% less energy than by aerobic digestion alone.

10. The method of claim 1, wherein the first wastewater influent stream has a first volumetric flow rate and the second wastewater influent stream has a second volumetric flow rate which is from about 25% to about 150% of the flow rate of the first wastewater influent stream.

11. The method of claim 1, wherein the first wastewater influent stream has an average residence time in the substantially aerobic digestion zone of from about 0.5 hour to about 24 hours.

12. The method of claim 1, wherein the second wastewater influent stream has an average residence time in the substantially anaerobic adsorption zone of from about 0.5 hour to about 4 hours.

* * * * *